(12) United States Patent
Deng et al.

(10) Patent No.: US 9,250,355 B2
(45) Date of Patent: Feb. 2, 2016

(54) DEVICE AND METHOD FOR OPTICAL BEAM COMBINATION

(75) Inventors: Qi Deng, San Jose, CA (US); Yaohui Xie, Santa Clara, CA (US); Li Zeng, Santa Clara, CA (US); Xiaolu Song, Santa Clara, CA (US)

(73) Assignee: Futurwei Technologies, Inc., Plano, TX (US)

( * ) Notice: Subject to any disclaimer, the term of this patent is extended or adjusted under 35 U.S.C. 154(b) by 1016 days.

(21) Appl. No.: 13/080,976

(22) Filed: Apr. 6, 2011

(65) Prior Publication Data

US 2012/0257902 A1    Oct. 11, 2012

(51) Int. Cl.
  *G02B 5/30*  (2006.01)
  *G02B 27/28* (2006.01)
  *G02B 1/04*  (2006.01)
  *H04B 10/50* (2013.01)

(52) U.S. Cl.
  CPC ............... *G02B 1/04* (2013.01); *H04B 10/506* (2013.01); *G02B 5/30* (2013.01)

(58) Field of Classification Search
  CPC ........... G02B 1/04; G02B 5/30; H04B 10/506
  USPC ........................................ 359/483.01–494.01
  See application file for complete search history.

(56) References Cited

U.S. PATENT DOCUMENTS

| | | | |
|---|---|---|---|
| 6,043,935 A | 3/2000 | Lee | |
| 6,222,627 B1 * | 4/2001 | Seitz et al. | 356/326 |
| 6,282,025 B1 | 8/2001 | Huang et al. | |
| 6,859,316 B1 | 2/2005 | Huang et al. | |
| 6,876,784 B2 | 4/2005 | Nikolov et al. | |
| 6,919,989 B1 | 7/2005 | Deng et al. | |
| 7,006,287 B2 | 2/2006 | Chen et al. | |
| 7,031,574 B2 | 4/2006 | Huang et al. | |
| 7,233,442 B1 * | 6/2007 | Brown et al. | 359/556 |
| 7,447,436 B2 * | 11/2008 | Yee et al. | 398/95 |
| 7,468,840 B2 * | 12/2008 | Cohen et al. | 359/489.08 |
| 7,734,177 B2 | 6/2010 | Jiang | |
| 7,817,688 B2 | 10/2010 | Uberna et al. | |
| 2002/0191290 A1 | 12/2002 | Chang et al. | |
| 2007/0014008 A1 | 1/2007 | Kennedy | |
| 2008/0118243 A1 | 5/2008 | Wen et al. | |
| 2009/0195874 A1 | 8/2009 | Krasutsky | |
| 2010/0110556 A1 | 5/2010 | Chann et al. | |
| 2010/0166423 A1 | 7/2010 | Chang et al. | |
| 2012/0189306 A1 * | 7/2012 | Du et al. | 398/65 |

FOREIGN PATENT DOCUMENTS

WO    WO 2010025536 A1 *    3/2010

* cited by examiner

*Primary Examiner* — Stephone B Allen
*Assistant Examiner* — Tamara Y Washington
(74) *Attorney, Agent, or Firm* — Slater & Matsil, L.L.P.

(57) ABSTRACT

An optical apparatus includes a first beam combining device arranged to receive a first optical beam having a first wavelength at a first location and a second optical beam output having a second wavelength at a second location. The second optical beam has a polarization that is substantially orthogonal to a polarization of the first optical beam. The first beam combining device configured to output a first combined beam that comprises a combination of the first optical beam and the second optical beam. An optical element is arranged to receive the first combined beam and a second combined beam and to transmit an output beam that includes a combination of the first combined beam and the second combined beam.

31 Claims, 8 Drawing Sheets

DEVICE AND METHOD FOR OPTICAL BEAM COMBINATION

TECHNICAL FIELD

The present invention relates optical devices and method and, in particular embodiments, to a device and method for optical beam combination.

BACKGROUND

With the explosion of the Internet and other communications needs, there is an on-going need for faster communications networks. Long haul communications are often accomplished over an optical network. An optical communication system includes a transmitter that encodes a message into an optical signal, a channel that carries the signal to its destination, and a receiver that reproduces the message from the received optical signal.

In fiber-optic communications, wavelength-division multiplexing (WDM) is a technology that combines (multiplexes) a number of optical carrier signals onto a single optical fiber by using different wavelengths of laser light. Since its first deployment in the middle of 1990s, dense wavelength division multiplexing (DWDM) has become a dominant technology for long haul and regional backbone transport networks, and is gradually making its way to metro area networks.

The combination of the different light beams can be implemented using an optical multiplexer. An optical multiplexer merges a number of optical signals that are each at a different optical wavelength into optical alignment as a single multiplexed signal. For example, optical signals produced at different optical wavelengths by a corresponding number of distinct lasers may be combined by an optical multiplexer into a multiplexed transmitted signal that can then be retransmitted from a single multiplexed signal transmitting port.

An optical demultiplexer reverses this process, separating a multiplexed signal that includes a plurality of signals at distinct wavelengths into the corresponding constituent signals. Thus, a multiplexed received signal from a single signal receiving port can be converted by an optical demultiplexer into the separate received signals at respective individual wavelengths that are included in the original multiplexed received signal. In an optical system, therefore, an optical demultiplexer is the interconnecting link between a single optical fiber on which a multiplexed received signal is being communicated and a plurality of optical fibers that each bears an individual of the received signals that had been included in that original multiplexed received signal

SUMMARY OF THE INVENTION

In one embodiment, an optical apparatus comprises a first beam combining device arranged to receive a first optical beam having a first wavelength at a first location and a second optical beam output having a second wavelength at a second location. The second optical beam has a polarization that is substantially orthogonal to a polarization of the first optical beam. The first beam combining device is configured to output a first combined beam that comprises a combination of the first optical beam and the second optical beam.

A second beam combining device is arranged to receive a third optical beam having a third wavelength at a first location and a fourth optical beam having a fourth wavelength at a second location. The fourth optical beam has a polarization that is substantially orthogonal to a polarization of the third optical beam. The second beam combining device is configured to output a second combined beam that comprises a combination of the third optical beam and the fourth optical beam.

An optical element is arranged to receive the first combined beam and the second combined beam and to transmit an output beam that includes a combination of the first combined beam and the second combined beam.

In another embodiment, an optical apparatus comprises a first laser and a second laser. A collimating lens is arranged adjacent an optical output of the first laser and an optical output of the second laser. A wave plate is arranged between the collimating lens and the optical output of the second laser. The collimating lens is located between an optical combiner and the first and second lasers. The optical combiner is configured to output a single optical beam that comprises a combination of a beam from the first laser and a beam from the second laser.

Another embodiment provides a method of transmitting an optical signal. A first optical signal having a first wavelength and a second optical signal having a second wavelength are received. A polarization direction of the second optical signal is rotated and the first optical signal and the polarization-rotated second optical signal are combined in a first polarization beam combiner to generate a first combined optical signal. A third optical signal having a third wavelength and a fourth optical signal having a fourth wavelength are also received. A polarization direction of the fourth optical signal is rotated and the third optical signal and the polarization-rotated fourth optical signal are combined in a second polarization beam combiner to generate a second combined optical signal. The first combined optical signal and the second combined optical signal are combined to generate a multi-wavelength optical signal.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of specific embodiment, namely the combination of multi-wavelength light beams for data communications. It is understood, however, that aspects of the invention could also be applied in different contexts.

Figure 1:
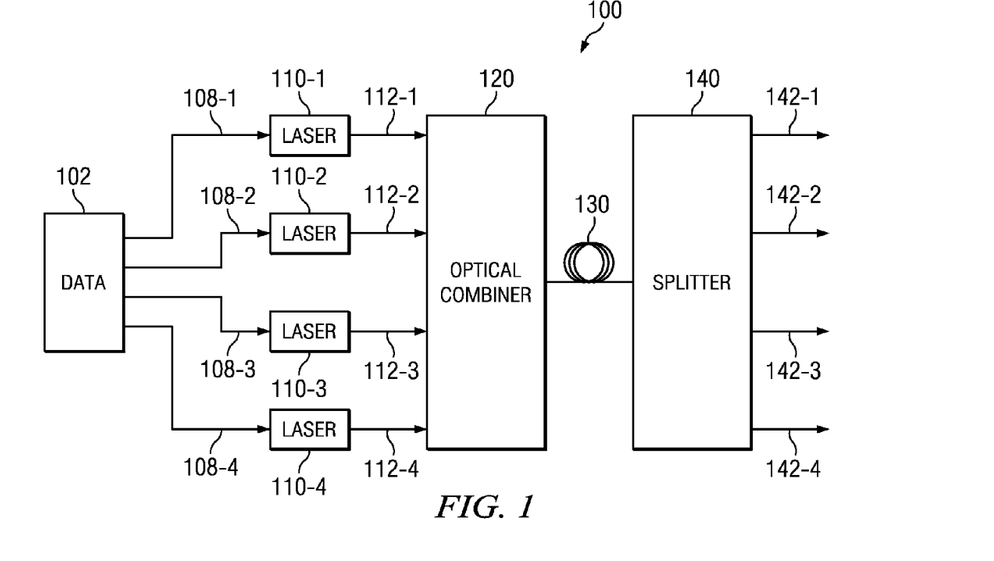
FIG. 1 illustrate a block diagram of a system that utilizes concepts of the present invention.

FIG. 1 illustrates an example of an optical communication system 100 that can utilize aspects of the present invention. The system of FIG. 1 is provided only as an example and it is understood that other systems and variations are within the scope of the present invention.

In one example, a four wavelength WDM (wavelength divisional multiplexing) is described. For example, an embodiment of this invention can be used in the manufacturing of a 4λ transmitter optical sub assembly for a 40 Gb/s or 100 Gb/s P2P (point to point) optical module in the field of DataCom and Telecom. As described herein and otherwise understood, other implementations and variations are disclosed.

In the illustrated example, a data source 102 provides four electrical signals 108-1 to 108-4 (collectively 108) to be communicated across the system 100. The data source 102 is provided to represent any type of information such as data, voice, video, audio, etc. For example, the data source 102 may be a router or a switch in the system 100. In another example, the data source 102 could be a server that provides the information to be transmitted. In one example, each signal 104 can carry a 25 Gb/s signal bit rate.

The electrical signals 108 can be originated at four separate locations. For example, in a communication switch each of the signals 108 could come from a different channel. In another example, one or more signals are demultiplexed into the signals 108. For example, a serial-to-parallel converter can take the bits of a serial data stream and generate a number of parallel lines, e.g., all or a subset of all of the lines 108.

The system of FIG. 1 shows four signals 108. It is understood, however, that more or fewer signals could be used. In one embodiment, only two data signals are to be combined and transmitted. In another embodiment, six or eight data signals are to be combined and transmitted. Other numbers are also possible.

Each electrical signal 108-1 to 108-4 is provided to a respective laser 110-1 to 110-4 (collectively 110). The lasers 110 convert the electrical signals into optical signals 112-1 to 112-4 (collectively 112). In one embodiment, each of the lasers 110 generates a light beam 112 at a different wavelength. In one example, the wavelengths are 1295.56 nm, 1300.05 nm, 1304.58 nm, and 1309.14 nm. The wavelengths can also be different depending upon the application. These light beams 112 can then be combined into a single light beam, which can be transmitted along optical fiber link 130.

The light beams are combined by optical combiner 120. Details of a number of embodiments of the optical combiner 120 are provided below with reference to FIGS. 2-10. As will be discussed below, an optical multiplexer transmitter optical sub assembly (TOSA) is a key O-E (optical to electrical) component of 40 Gb/s or 100 Gb/s point-to-point (P2P) optical modules.

A point-to-point optical transceiver module, such as optical combiner 120, plays an important role in modern communication technology. For example, these devices can be used in a high speed link between one element in a network to another element at a remote point. For example, the transceiver can link one router to another router, one data center to another data center, or one router to an optical transport network. Other examples are also possible.

The optical fiber link 130 terminates (at least schematically) at a splitter 140. The splitter 140 converts the multi-wavelength optical signal in a number (i.e., four in the illustrated example) single-wavelength optical signals 142-1 to 142-4 (collectively 142). The signals 142 can then be converted to electrical signals to be processed or otherwise utilized. In another example, the individual optical signals 142 can be optically switched, e.g., providing an optical signal input 108 of a different system such as the one illustrated in FIG. 1.

In one embodiment, the present invention provides an optical multiplexer transmitter optical sub assembly 120 that combines optical beams of four different wavelengths into a single optical beam that can be, for example, transmitted along optical fiber link 130. For example, the light beams from two discrete lasers or lasers in an array are launched into a collimating lens. One of these two light beams goes through a wave plate before the lens so that its polarization direction rotates 90°. The two light beams with orthogonal polarization direction are combined together as one light beam after the two light beams pass through a polarization beam combiner, which, for example, can be made of birefringence crystal wedges or a birefringence crystal. Two of these sub assemblies are integrated together and their light beams are combined as one beam by a thin film filter. This technique realizes one four-wavelength transmitter optical sub assembly.

Advantageously, the apparatus is implemented with a single thin filter (labeled 162 in FIG. 4, as an example) rather than the three pieces of thin film filters that are used in conventional thin film filters. The present state of the industry of communication requires higher and higher transport data rate of optical module. Embodiments of this invention uses two beam combiner and one thin film filter to realize an integrated four wavelength transmitter optical sub assembly, which is a key component of current P2P 40 G/100 G optical module.

Figure 2:
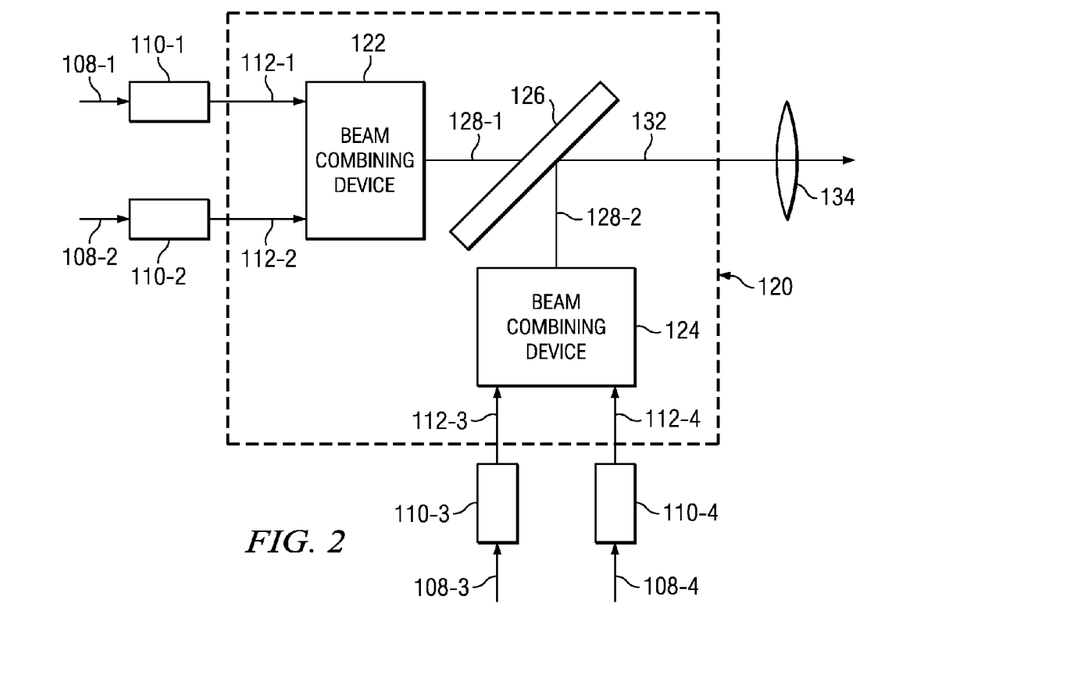
FIG. 2 illustrates a block diagram of an optical device of the present invention.

FIG. 2 illustrates an example of such an optical apparatus 120. Referring to this figure, a first beam combining device 122 is arranged to receive a first optical beam 112-1 having a first wavelength at a first location and a second optical beam 112-2 having a second wavelength at a second location. In one embodiment, the second optical beam 112-2 has a polarization that is substantially orthogonal to a polarization of the first optical beam 112-1. The first beam combining device 122 is configured to output a first combined beam 128-1 that comprises a combination of the first optical beam 112-1 and the second optical beam 112-2.

In the example of FIG. 2, the optical beams 112 are generate by lasers 110. In other embodiments, the optical beams 112 can be received from a different source. For example, the optical combiner 120 can be implemented as an optical multiplexer that serves as the interconnecting link between a number of optical fibers bearing a corresponding number of transmitted signals and a single optical fiber on which the signals are able to be communicated in the form of a multi-plexed transmission signal.

Similarly, a second beam combining device 124 is arranged to receive a third optical beam 112-3 having a third wavelength at a first location and a fourth optical beam 112-4 having a fourth wavelength at a second location. In one embodiment, the fourth optical beam 112-4 has a polarization that is substantially orthogonal to a polarization of the third optical beam 112-3. The second beam combining device 124 is configured to output a second combined beam 128-2 that comprises a combination of the third optical beam 112-3 and the fourth optical beam 112-4.

An optical element 126, which may include more than one physical element, is arranged to receive the first combined beam 128-1 and the second combined beam 128-2 and to transmit an output beam 132 that includes a combination of the first combined beam 128-1 and the second combined beam 128-2. This output beam 132 can be supplied to the fiber 130 (FIG. 1), e.g., through a focusing lens 134.

The following discussion will provide but a few examples of particular implementations of the optical device 120. From the teachings herein, one of ordinary skill could further modify and combine these examples to achieve further embodiments.

Figure 3:
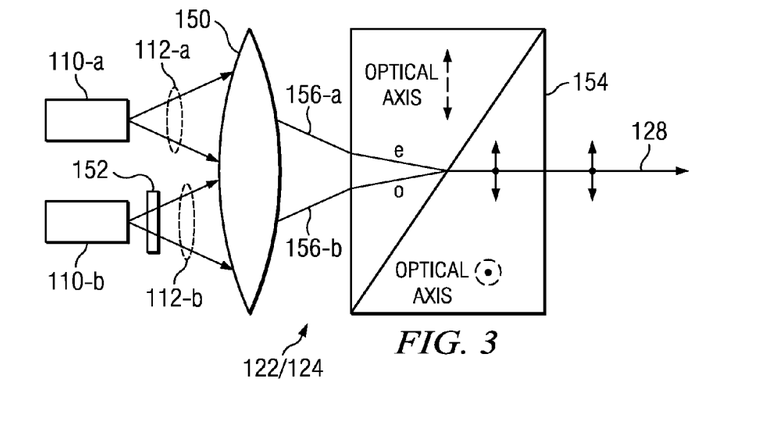
FIG. 3 illustrates a block diagram of an optical sub-assembly of the present invention.

Referring to FIG. 3, two laser diodes 110-a and 110-b are placed close to each other or in an array. (In this nomenclature, 110-a and 110-b refer generally to any ones of 110-1, 110-2, 110-3 or 100-4 in a four signal system. Such nomenclature is also applied to the other numbered elements described herein, such as 112-a and 112-b for example.) The beams from these two lasers launch into a collimation lens 150 (collectively; individually referred to herein as 150-1, 150-2, 150-3, 150-4, 150-a, or 150-b) and become collimated beams 156-a and 156-b (collectively 156). One of these two beams goes through a half wave plate 152 (collectively; individually referred to herein as 152-1 or 150-2) before the lens 150 so that its polarization direction rotates 90°. The two orthogonal polarization beams 156 are combined by using a prism 154, e.g., a Wollaston prism, as a polarization beam combiner (e.g., as labeled 122 or 124 in FIG. 2).

The two laser beams 156 become collimated beams and the two beams have a certain angle. In the illustrated embodiment, the Wollaston prism 154 is made of two optical birefringence crystal wedges with optical axis direction shown in FIG. 3. By selecting the wedges angle, the angle between 'o' beam and 'e' beam and the angle between two collimated beams will be identical, such that the two laser beams 156 with orthogonal polarization direction will be combined as one beam 128.

Figure 4:
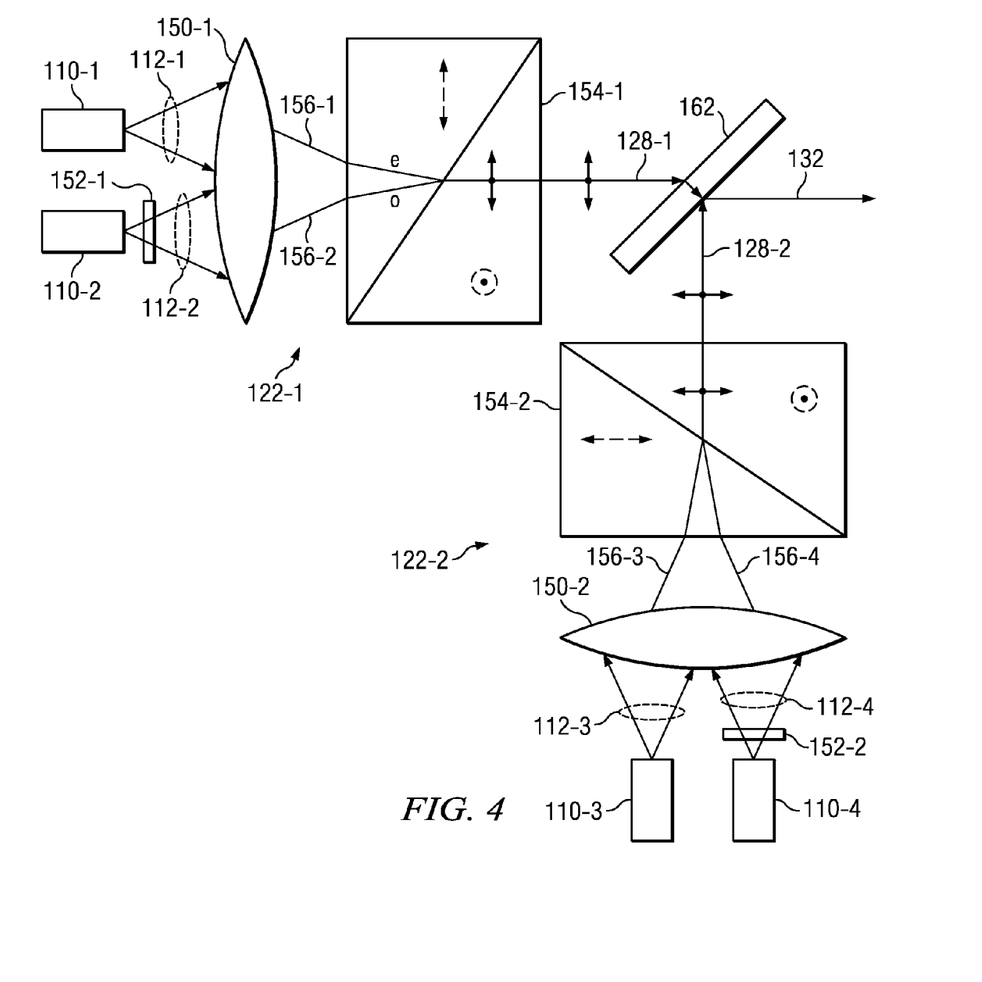
FIG. 4 illustrates a block diagram of an embodiment of optical apparatus.
Figure 5:
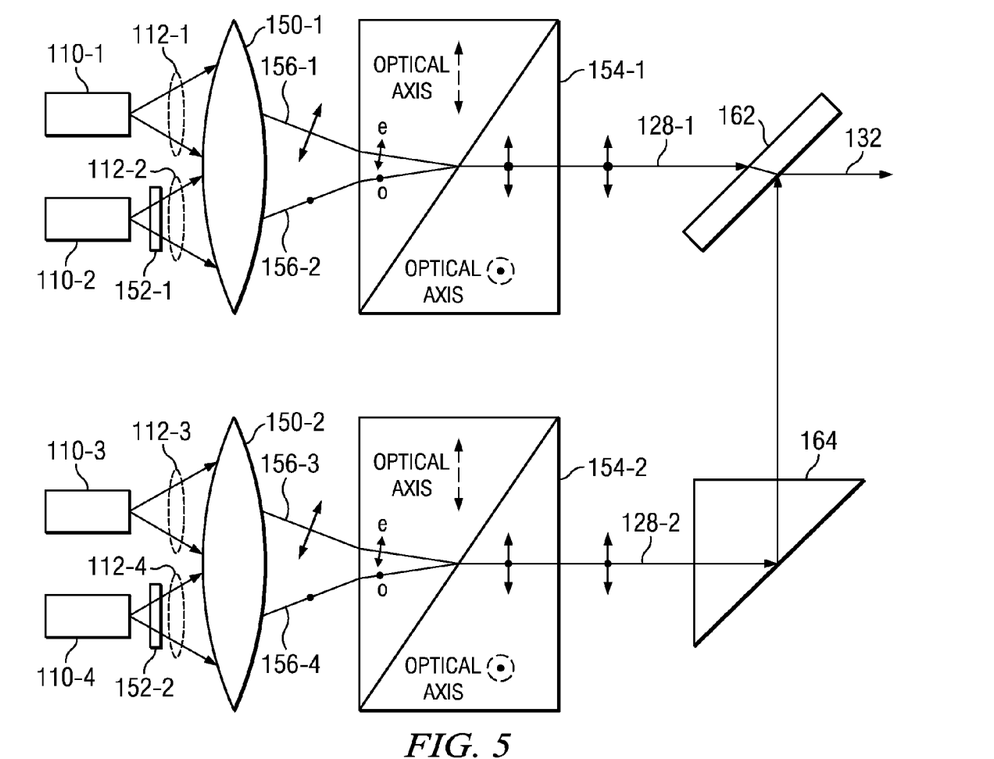
FIG. 5 illustrates a block diagram of another embodiment of optical apparatus.
Figure 6:
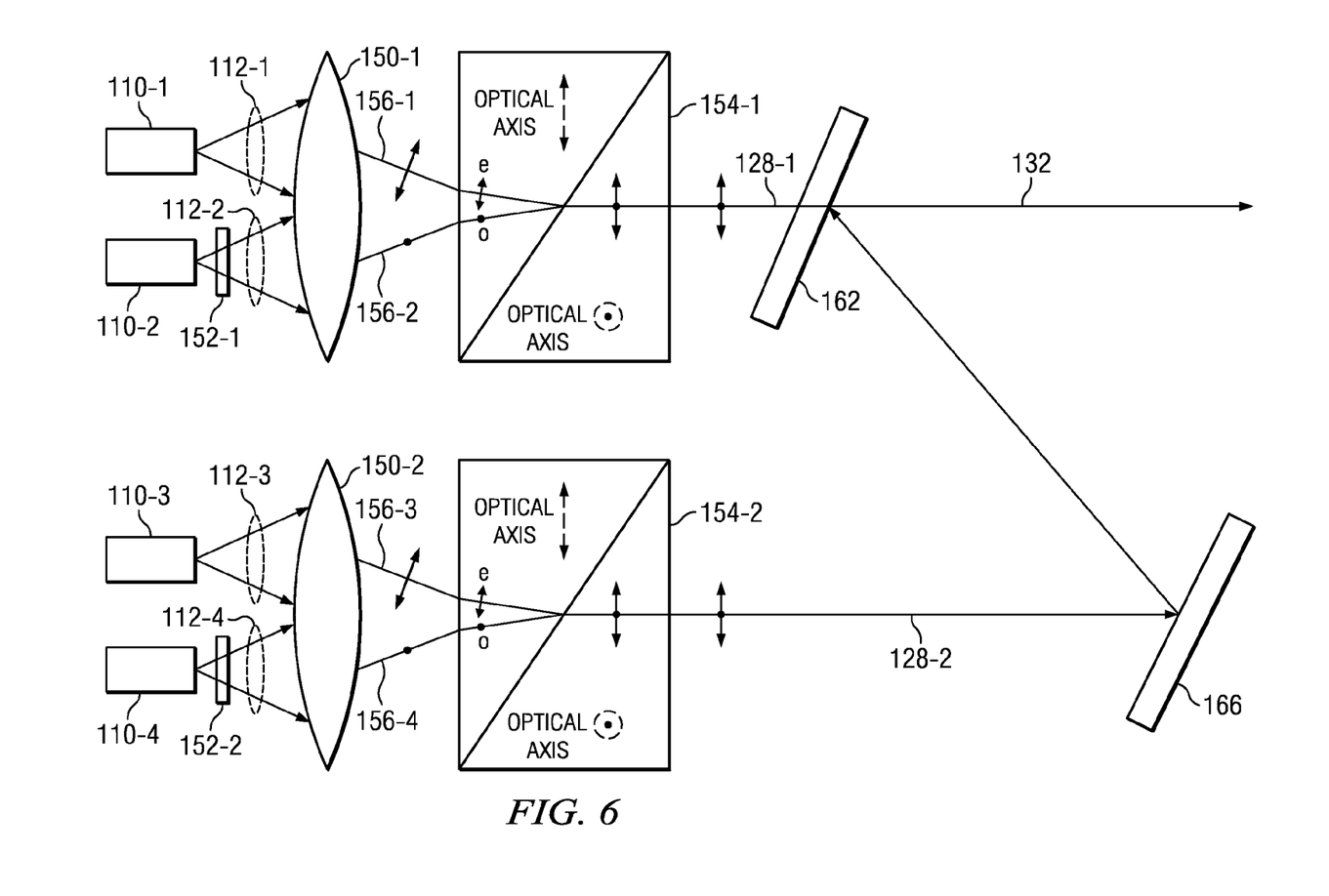
FIG. 6 illustrates a block diagram of another embodiment of optical apparatus.

Two of these optical sub assemblies 122 can be integrated together so that light beams at different wavelengths are combined through an optical dielectric low/high pass thin film filter 162. This apparatus realizes a four wavelength optical multiplexer that combines four laser beams at different wavelengths into one beam and serves as a transmitter optical sub assembly (TOSA). There are several configurations to realize this kind of TOSA. FIGS. 4-6 show three of these configurations.

Referring to FIG. 4, the output 128-1 of the first optical sub assembly 122-1 and the output 128-2 of the second optical sub assembly 122-2 are directly combined using a thin film filter 162. In this embodiment, the optical element 126 (FIG. 2) comprises a thin film filter. This kind of filter uses thin film coating technology to coat a multilayer thin film on a glass substrate. It can serve as a high, low or bandpass filter of the optical spectrum.

FIG. 5 shows another embodiment. In this example, a reflector 164 is used to reflect beam 128-2 by 90°. The reflector can be as simple as a mirror or a total reflection prism, as but two examples. The beams 128-1 and 128-2 can then be combined by thin film filter 162. While the example shows a 90° reflection, it is clear that other angles can be used (see e.g., FIG. 6). In this embodiment, all of the laser source are arranged in a row (or an array), which could simplify the construction.

FIG. 6 shows yet another embodiment. In this case, a reflector 166 in zigzag form is used to combine light beams 128-1 and 128-1 via thin film filter 162. By using more WDM thin film filters 162, this configuration can combine the light beams from more than four sources. The reflector can be as simple as a mirror or a total reflection prism, as but two examples.

Figure 7:
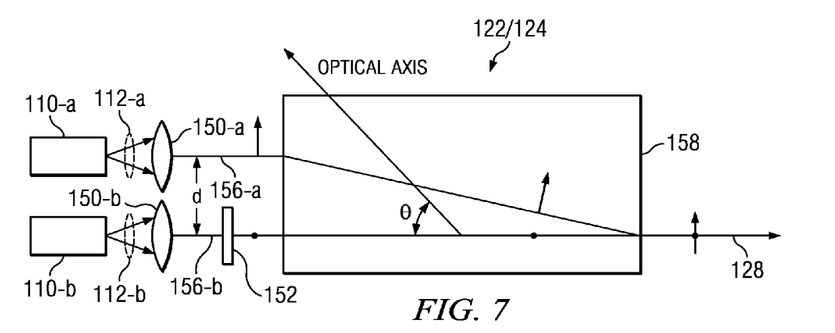
FIG. 7 illustrates a block diagram of another embodiment of optical apparatus.

FIG. 7 illustrates another construction of a sub-assembly 122. Two discrete lasers 110 are placed within a distance 'd' from each other. Alternately, the lasers can be formed in a single substrate in an array. The two light beams 112 are collimated after collimating lens 150. In this case, the collimating lens 150 is illustrated as two separate lens 150-a and 105-b while the embodiment of FIG. 3 illustrated a single lens 150. It is understood that either embodiment could use either configuration. In fact, the embodiments of FIGS. 4-6 and 8-10 could use a mix and match of the variations discussed here.

One of the light beams 156-b will go through a λ/2 wave plate 152 so that its polarization direction will rotate 90°. This causes the two beams polarization directions to become orthogonal, as shown in the figure. Then, the two beams 156 launch into a birefringence crystal beam displacer 158, which has optical axis angle 'θ' and is placed as shown in the figure. By selecting the correct length of beam displacer 158, the birefringence crystal beam displacer will combine the two orthogonal laser beams 156 into a single beam. In this example, the birefringence crystal beam displacer serves as a polarization beam combiner (e.g., as labeled 122 or 124 in FIG. 2).

Figure 8:
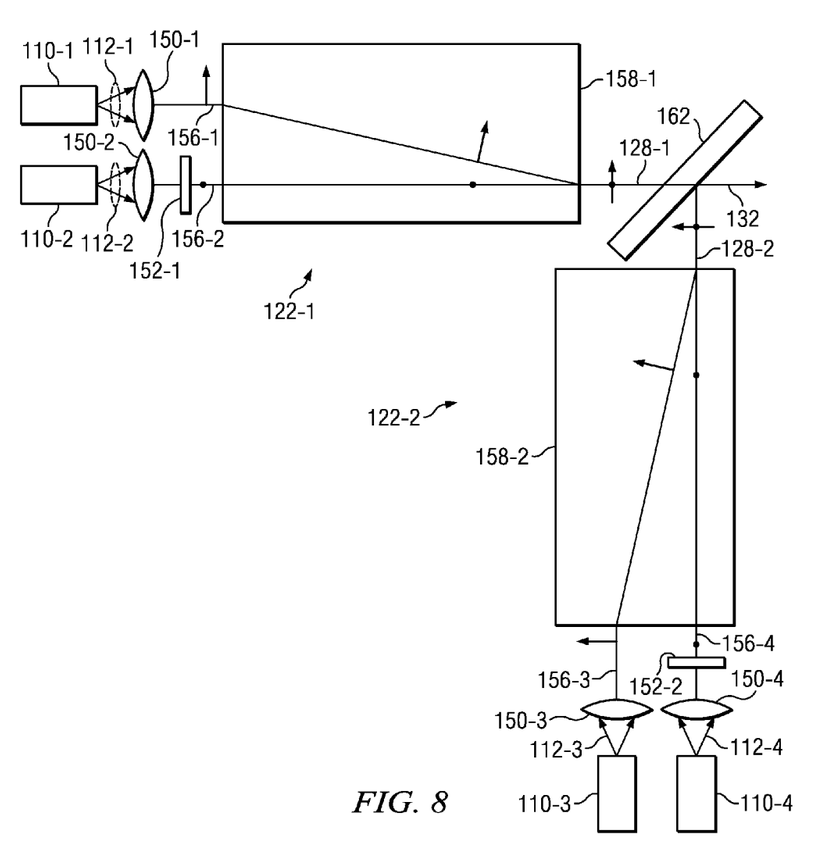
FIG. 8 illustrates a block diagram of another embodiment of optical apparatus.
Figure 9:
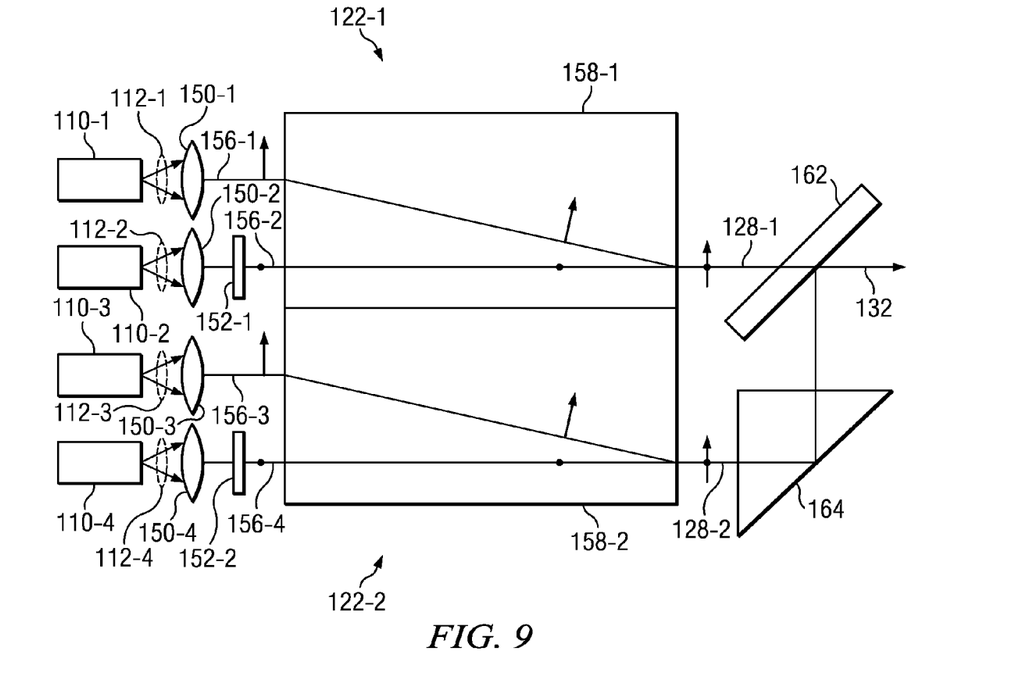
FIG. 9 illustrates a block diagram of another embodiment of optical apparatus.
Figure 10:
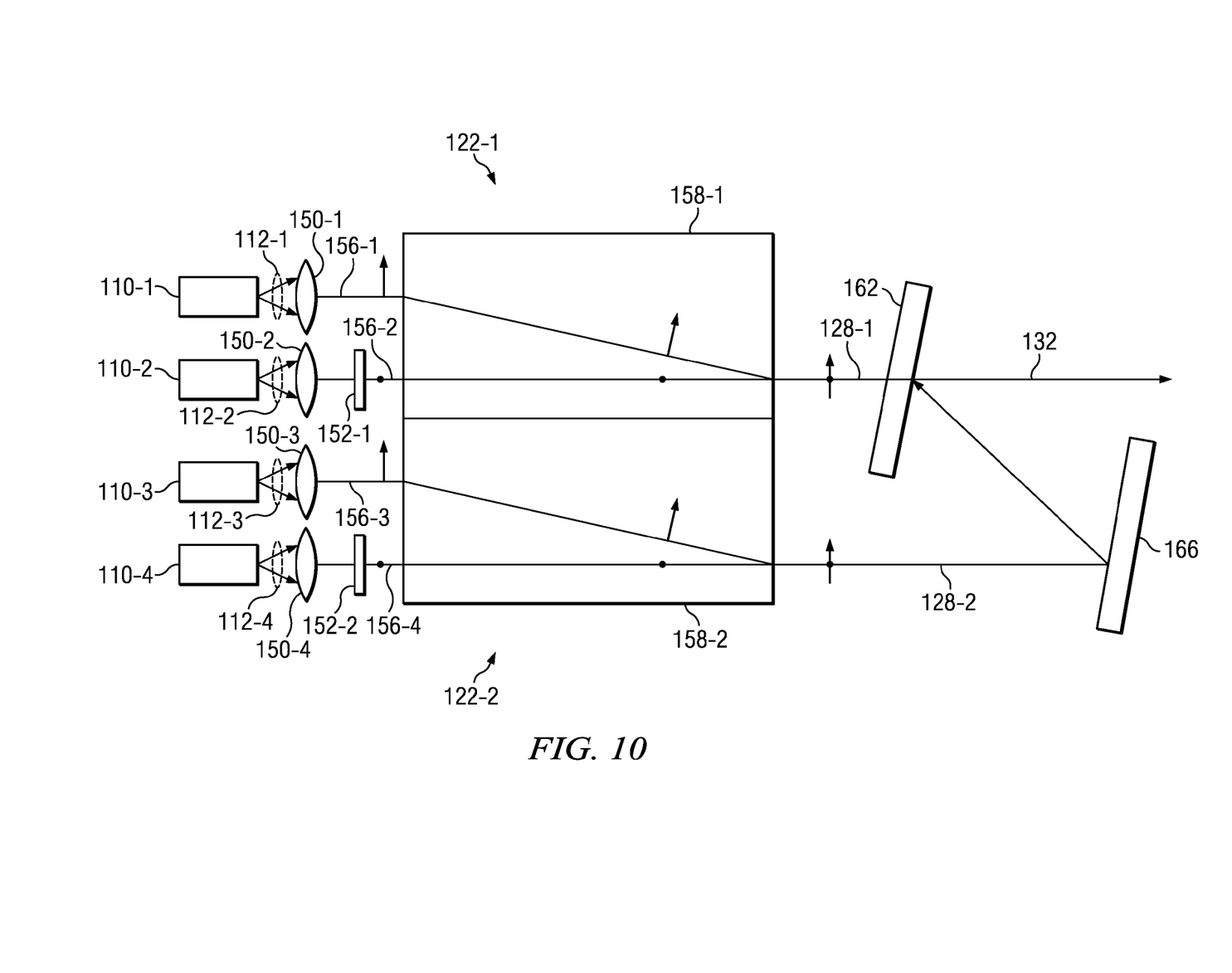
FIG. 10 illustrates a block diagram of another embodiment of optical apparatus.

As shown in FIGS. 8-10, two of these optical sub assemblies are integrated together and their light beams at different wavelengths are combined, e.g., through an optical dielectric low/high pass thin film filter 162. This assembly realizes a four wavelength optical multiplexer which combines four laser beams at different wavelengths as a single beam and serves as a transmitter optical sub assembly (TOSA). There are several configurations to realize this kind of TOSA, just three of which are illustrated here.

FIGS. 8-10 show combinations similar to what was described with respect to FIGS. 4-6. Similar to FIG. 4, FIG. 8 illustrates an embodiment where the light beams 128 are directly combined using thin film filter 162. Similar to FIG. 5, FIG. 9 illustrates an embodiment where a reflector 164 is used to reflect beam 156-b, e.g., by 90°, for combining the beams 156 via thin film filter 162. Similar to FIG. 6, FIG. 10 illustrates an embodiment where reflector 166, e.g., in zig-zag form, is used to combine light beams via thin film filter 162. Once again, by using more WDM thin film filters, these configurations can combine the light beams from more than four sources.

Each of these examples has shown the use of a polarization beam combiner and λ/2 wave plate to combine two laser beams as one. An optical dielectric thin film filter can then be used to combine two light beams from above optical sub assembly. This device realizes a four-wavelength or even more wavelength optical multiplexer and serves as a four wavelength transmitter optical sub assembly. Although a few specific examples have been shown, it is understood that other optical configurations are possible.

Figure 11:
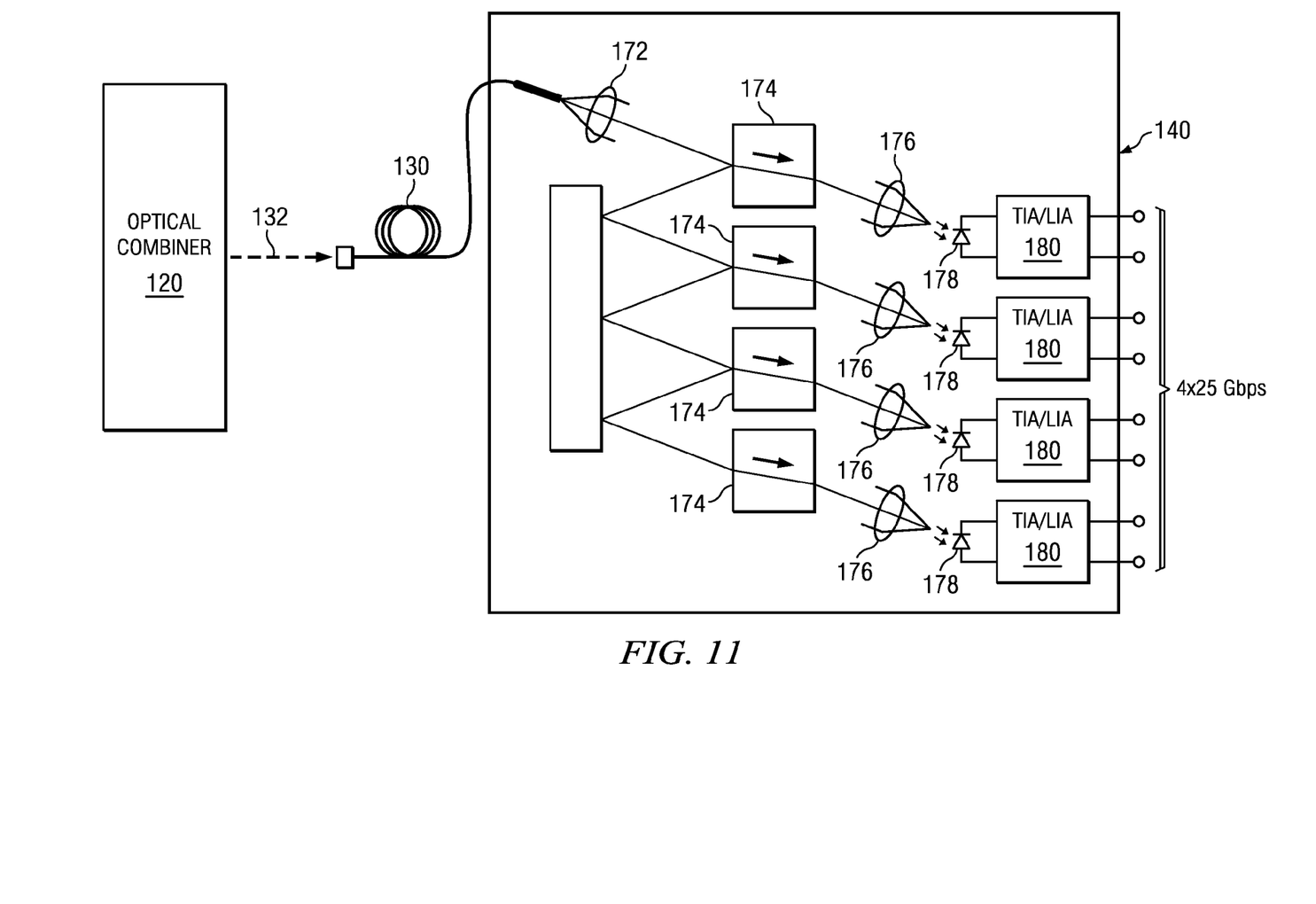
FIG. 11 illustrate a block diagram of a system that utilizes concepts of the present invention.

FIG. 11 illustrates a specific example of where the optical apparatus 120 is used in a fiber optic communication system. As discussed with respect to FIG. 1, the output of the beam combiner 120 is fed to an optic fiber link 130, which in turn terminates with an optical splitter 140. FIG. 11 provides but one example of an optical splitter 140.

In this example, the multi-wavelength output of fiber link 130 is provided to collimating optics 172, which directs the multi-wavelength beam to a LAN WDM TFF filter. This filter separates the multi-wavelength beam into four single-wavelength beams. (Of course, the number of single-wavelength beams will vary if the level of multiplexing varies.)

Each single wavelength beam is directed toward focusing optics 176, which directs the beam to an optical-to-electrical converter. In the illustrated example, the optical-to-electrical converter includes, for each branch, a PIN diode 178 and a trans-impedance amplifier 180. The amplifier 180 provides the electrical signals that can then be processed, transmitted or whatever is necessary for the given system. In this example, the electrical output includes four 25 Gbps signals. Other implementations are also possible.

Embodiments of the optical apparatuses as described herein can also be described or illustrated in terms of methods comprising functional steps and/or non-functional acts. The following description and related flow diagrams illustrate steps and/or acts used in practicing example embodiments of the present invention. Usually, functional steps describe the invention in terms of results that are accomplished, whereas non-functional acts describe more specific actions for achieving a particular result or step. Although the functional steps and/or non-functional acts may be described or claimed in a particular order, the present invention is not necessarily limited to any particular ordering or combination of steps and/or acts. Further, any use (or non use) of "steps for" and/or "acts of" in the recitation of the claims is used to indicate the desired specific use (or non-use) of such terms.

Figure 12:
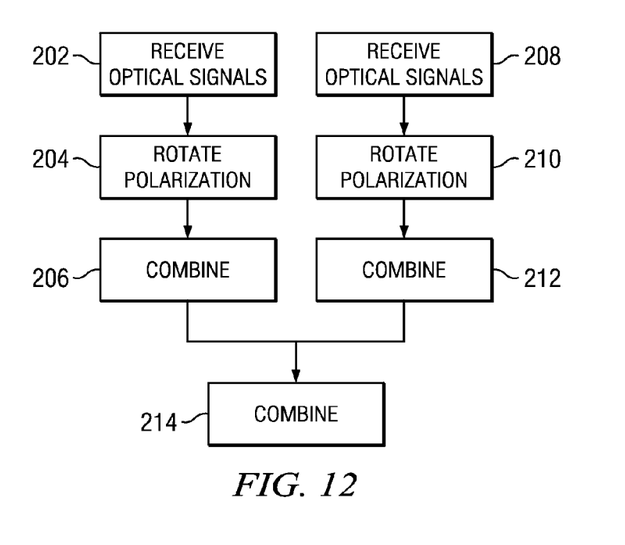
FIG. 12 illustrates a flow chart of an example embodiment method.

FIG. 12 illustrates a flow chart of an example method embodiment. A first optical signal having a first wavelength and a second optical signal having a second wavelength are received (box 202). A polarization direction of the second optical signal is rotated, e.g., by 90°, (box 204) and the first optical signal and the polarization-rotated second optical signal are combined in a first polarization beam combiner to generate a first combined optical signal (box 206). A third optical signal having a third wavelength and a fourth optical signal having a fourth wavelength are also received (box 208). A polarization direction of the fourth optical signal is rotated, e.g., by 90°, (box 210) and the third optical signal and the polarization-rotated fourth optical signal are combined in a second polarization beam combiner to generate a second combined optical signal (box 212). The first combined optical signal and the second combined optical signal are combined to generate a multi-wavelength optical signal (box 214).

In one embodiment, receiving the optical signals (202 and 208) entails receiving electrical signals that are converted to optical signals. For example, in four-channel 100 Gbit electrical-to-optical transmitter, four 25 Gbps electrical signals can be received and converted to optical signals, e.g., using a laser such as a laser diode. In a 40 Gbit electrical-to-optical transmitter, four 10 Gbps electrical signals are converted. Other examples are also possible.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical apparatus comprising:
a first beam combining device arranged to receive, at a first location of the first beam combining device, a first optical beam having a first wavelength and to receive, at a second location of the first beam combining device, a second optical beam having a second wavelength, the second optical beam having a polarization that is substantially orthogonal to a polarization of the first optical beam, the first beam combining device configured to output a first combined beam that comprises an orthogonally polarized combination of the first optical beam and the second optical beam having the polarization that is substantially orthogonal to a polarization of the first optical beam;
a second beam combining device arranged to receive, at a first location of the second beam combining device, a third optical beam having a third wavelength and to receive, at a second location of the second beam combining device, a fourth optical beam having a fourth wavelength, the fourth optical beam having a polarization that is substantially orthogonal to a polarization of the third optical beam, the second beam combining device configured to output a second combined beam that comprises an orthogonally polarized combination of the third optical beam and the fourth optical beam having the polarization that is substantially orthogonal to a polarization of the third optical beam; and
an optical element arranged to receive the first combined beam that comprises the orthogonally polarized combination of the first optical beam and the second optical beam and the second combined beam that comprises the orthogonally polarized combination of the third optical beam and the fourth optical beam and to transmit an output beam that includes a combination of the first combined beam and the second combined beam.

2. The optical apparatus of claim 1, wherein the first beam combining device comprises a prism.

3. The optical apparatus of claim 2, wherein the first beam combining device comprises a Wollaston prism.

4. The optical apparatus of claim 2, wherein the second beam combining device comprises a prism.

5. The optical apparatus of claim 1, wherein the first beam combining device comprises a birefringence crystal beam displacer.

6. The optical apparatus of claim 5, wherein the second beam combining device comprises a birefringence crystal beam displacer.

7. The optical apparatus of claim 1, wherein the first beam combining device comprises birefringence crystal wedges.

8. The optical apparatus of claim 1, further comprising a first half wave plate arranged in a beam path of the second optical beam and a second half wave plate arranged in a beam path of the fourth optical beam.

9. The optical apparatus of claim 1, further comprising:
a first laser configured to generate the first optical beam;
a second laser configured to generate the second optical beam;
a third laser configured to generate the third optical beam; and
a fourth laser configured to generate the fourth optical beam.

10. The optical apparatus of claim 9, further comprising:
a first electrical input coupled to an electrical input of the first laser, the first electrical input to carry a 25 Gbps signal;
a second electrical input coupled to an electrical input of the second laser, the second electrical input to carry a 25 Gbps signal;
a third electrical input coupled to an electrical input of the third laser, the third electrical input to carry a 25 Gbps signal; and
a fourth electrical input coupled to an electrical input of the fourth laser, the fourth electrical input to carry a 25 Gbps signal.

11. The optical apparatus of claim 1, wherein the first beam combining device is arranged to receive the first optical beam from a first optical fiber and to receive the second optical beam from a second optical fiber.

12. The optical apparatus of claim 1, further comprising a focusing lens located in a beam path of the output beam.

13. The optical apparatus of claim 1, wherein the first wavelength is 1295.56 nm, the second wavelength is 1300.05 nm, the third wavelength is 1304.58 nm, and the fourth wavelength is 1309.14 nm.

14. The optical apparatus of claim 1, wherein the optical element comprises a thin film filter.

15. The optical apparatus of claim 14, wherein the optical element further comprises a reflector.

16. The optical apparatus of claim 15, wherein the reflector comprises a mirror.

17. The optical apparatus of claim 15, wherein the reflector comprises a total reflection prism.

18. The optical apparatus of claim 1, wherein the first beam combining device outputs the first optical beam in a first direction;
wherein the second beam combining device outputs the second optical beam in a second direction; and
wherein the optical element is arranged to receive the first combined beam incident from the first direction and the second combined beam incident from the second direction.

19. An optical apparatus comprising:
a first laser configured to output light at a first wavelength;
a second laser configured to output light at a second wavelength that is different than the first wavelength;
a collimating lens arranged adjacent an optical output of the first laser and an optical output of the second laser;
a wave plate arranged between the collimating lens and the optical output of the second laser;
an optical combiner, wherein the collimating lens is located between the optical combiner and the first and second lasers, the optical combiner configured to output a single orthogonally polarized optical beam that comprises an orthogonally polarized combination of a beam from the first laser and a beam from the second laser;
a second optical beam source configured to output a second optical beam; and
an optical element arranged to receive the single orthogonally polarized optical beam and the second optical beam and output a combined optical beam.

20. The optical apparatus of claim 19, wherein the optical combiner comprises a prism.

21. The optical apparatus of claim 19, wherein the optical combiner comprises a birefringence crystal beam displacer.

22. The optical apparatus of claim 19, wherein the collimating lens comprises a first collimating lens arranged adjacent the optical output of the first laser and a second collimating lens arranged adjacent an optical output of the second laser.

23. The optical apparatus of claim 19, wherein the second optical beam source comprises:
a third laser configured to output light at a third wavelength that is different than the first and second wavelengths;
a fourth laser configured to output light at a fourth wavelength that is different than the first, second and third wavelengths;
a second collimating lens arranged adjacent an optical output of the third laser and an optical output of the fourth laser;
a second wave plate arranged between the second collimating lens and the optical output of the fourth laser; and
a second optical combiner, wherein the second collimating lens is located between the second optical combiner and the third and fourth lasers, the second optical combiner configured to output a second single orthogonally polarized optical beam that comprises an orthogonally polarized combination of a beam from the third laser and a beam from the fourth laser.

24. The optical apparatus of claim 23, wherein:
the optical combiner outputs the single orthogonally polarized optical beam straight in a first direction;
the second optical combiner outputs the second single orthogonally polarized optical beam straight in a second direction; and
the optical element is arranged to receive the single orthogonally polarized optical beam incident from the first direction and the second single orthogonally polarized optical beam incident from the second direction.

25. The optical apparatus of claim 19, wherein the optical element comprises a thin film filter.

26. The optical apparatus of claim 25, wherein the optical element further comprises a reflector.

27. An optical apparatus, comprising:
means for generating a first optical signal having a first wavelength;
means for generating a second optical signal having a second wavelength that is different than the first wavelength and a polarization direction that is rotated relative to a polarization direction of the first optical signal;
means for combining the first optical signal and the second optical signal and for generating a first combined optical signal comprising the first optical signal and the second optical signal with a polarization direction that is rotated relative to a polarization direction of the first optical signal;
means for generating a third optical signal having a third wavelength that is different than the first and second wavelengths;
means for generating a fourth optical signal having a fourth wavelength that is different than the first, second and third wavelengths and a polarization direction that is rotated relative to a polarization direction of the third optical signal;
means for combining the third optical signal and the fourth optical signal and for generating a second combined optical signal comprising the third optical signal and the fourth optical signal with a polarization direction that is rotated relative to a polarization direction of the third optical signal; and
means for combining the first combined optical signal and the second combined optical signal.

28. A method of transmitting an optical signal, the method comprising:
receiving a first optical signal having a first wavelength;
receiving a second optical signal having a second wavelength that is different than the first wavelength;
rotating a polarization direction of the second optical signal;
combining the first optical signal and the polarization-rotated second optical signal in a first polarization beam combiner to generate a first combined optical signal comprising the first optical signal and the polarization-rotated second optical signal;
receiving a third optical signal having a third wavelength that is different than the first and second wavelengths;
receiving a fourth optical signal having a fourth wavelength that is different than the first, second and third wavelengths;

rotating a polarization direction of the fourth optical signal;
combining the third optical signal and the polarization-rotated fourth optical signal in a second polarization beam combiner to generate a second combined optical signal comprising the third optical signal and the polarization-rotated fourth optical signal; and
combining the first combined optical signal comprising the first optical signal and the polarization-rotated second optical signal and the second combined optical signal comprising the third optical signal and the polarization-rotated fourth optical signal to generate a multi-wavelength optical signal.

29. The method of claim 28,
wherein receiving the first optical signal comprises receiving a first electrical signal and generating the first optical signal based upon the first electrical signal;
wherein receiving the second optical signal comprises receiving a second electrical signal and generating the second optical signal based upon the second electrical signal;
wherein receiving the third optical signal comprises receiving a third electrical signal and generating the third optical signal based upon the third electrical signal; and
wherein receiving the fourth optical signal comprises receiving a fourth electrical signal and generating the fourth optical signal based upon the fourth electrical signal.

30. The method of claim 29, wherein the first, second, third and fourth electrical signals each comprise 25 Gbps signals.

31. The method of claim 28, wherein rotating the polarization direction of the second optical signal comprises rotating the polarization direction by 90°.

* * * * *